June 22, 1965

W. LIMBERGER ETAL 3,190,200

APPARATUS FOR THE REPRODUCTION OF COPIES
BY DISTILLATION TRANSFER

Filed March 5, 1963

INVENTORS
WALTER LIMBERGER
RUDOLF WENDT

BY Karl F. Ross

AGENT

June 22, 1965   W. LIMBERGER ETAL   3,190,200
APPARATUS FOR THE REPRODUCTION OF COPIES
BY DISTILLATION TRANSFER
Filed March 5, 1963   3 Sheets-Sheet 2

INVENTOR
WATER LIMBERGER
RUDOLF WENDT

BY *Karl F. Ross*

AGENT

June 22, 1965  W. LIMBERGER ETAL  3,190,200
APPARATUS FOR THE REPRODUCTION OF COPIES
BY DISTILLATION TRANSFER
Filed March 5, 1963  3 Sheets-Sheet 3
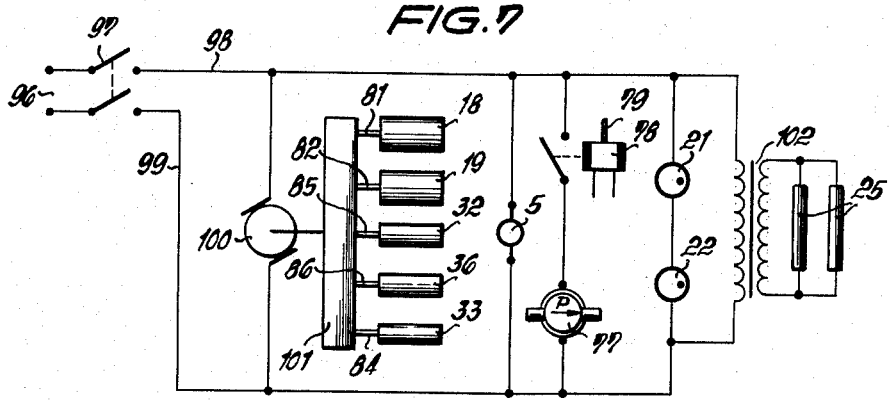
FIG. 7
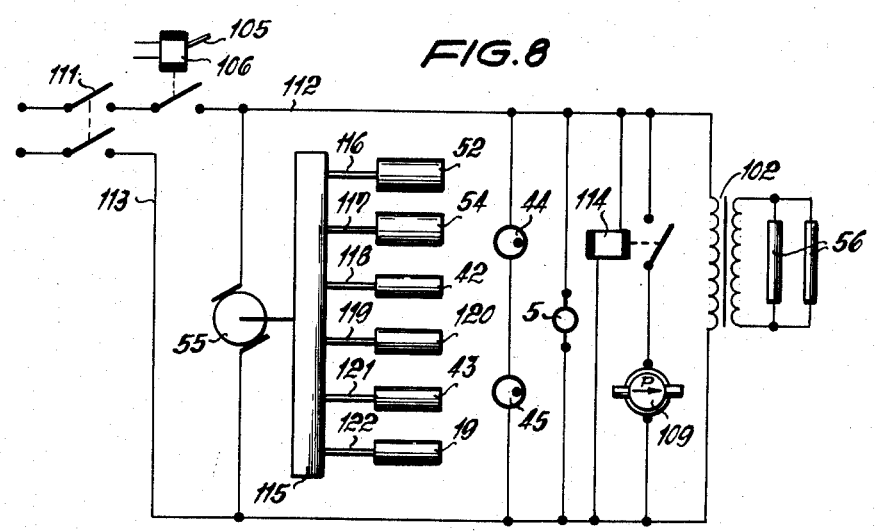
FIG. 8
FIG. 9
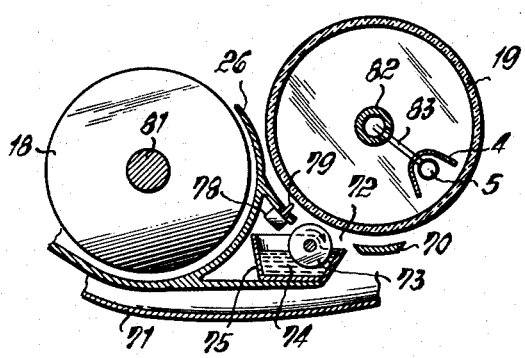
INVENTOR
WALTER LIMBERGER
RUDOLF WENDT
BY  *Karl G. Ross*
AGENT

United States Patent Office 3,190,200
Patented June 22, 1965

3,190,200
APPARATUS FOR THE REPRODUCTION OF COPIES BY DISTILLATION TRANSFER
Walter Limberger, Hamburg-Poppenbuttel, and Rudolf Wendt, Harksheide, Bezirk Hamburg, Germany, assignors to Lumoprint Zindler KG., Hamburg, Germany, a corporation of Germany
Filed Mar. 5, 1963, Ser. No. 263,018
Claims priority, application Germany, Mar. 9, 1962, L 41,418
6 Claims. (Cl. 95—1.7)

This invention relates to a device for producing images by using electrophotographic material.

It is known to charge electrophotographic materials and to produce in such material, by exposing an original to it, a defined charge distribution representing a latent image of an original or master.

According to a known method for producing images a film of light oil is provided on an original which, with its coated side, is brought into surface-contacting engagement with a receiving material, for example a sheet of paper, and is exposed to radiant energy which in certain dark areas of the original is transformed into heat whereby the oil in these areas will be transferred by distillation to the receiving material. The thus-produced oil image is covered with powder and this powder is annealed to produce a visible, fixed image. Initially this image is not legible so that the receiving material must be transparent in order to be legible on the back side.

Besides the fact that in this respect there are certain limitations with regard to the receiving material, another serious drawback must be seen in the fact that not any kind of master can be copied since certain images, for example aniline dyes, signatures or letterings with certain inks, and certain stamp dyes cannot be reproduced. Therefore, this method has not been successful in making office copies because manually written addenda were required to a great extent and outweighed the advantage of rapid copying.

The main object of the invention is to provide an apparatus employing oil distillation and permitting the copying of any kind of original or master sheet having contrasting images.

Another object of the invention is to provide an apparatus of the character described in which the original does not enter into contacting engagement with an oil film or any other medium whereby it may be soiled.

A further object of the invention is to provide an apparatus permitting reproduction of a legible image on a normal sheet of paper, such as the office stationery of a firm.

The apparatus according to the present invention solves these problems in that an electrophotographic material (e.g. a xerographic layer having the latent image) and a film of readily distillable oil covering the entire latent image and a film of readily distillable oil covering the entire latent image are brought into contacting engagement with a foil-like material and exposed to heat radiation, thereby forming in areas of the latent image zones of increased temperature which, in a manner known per se, cause distillation of the oil in these zones and a transfer onto the foil-like material, whereupon the oil distribution is used for producing the final image. In this the invention is based on the fact that the latent image acts as a so-called thermal shield which in the range of the latent image will cause zones of increased heat.

Thus the objects of the invention are realized since it is obvious that any kind of original with contrasting images may be copied irrespective of the manner of producing these images. Thus there is provided an office copying apparatus which is not restricted in any way.

Contrarily to the known methods using oil transferred by distillation, the original need not be wetted with the oil film and therefore remains unaffected and, according to the procedure to be described below, a legible image is obtained on a normal sheet of paper.

According to an advantageous embodiment, the side which is in contacting engagement with the original during the transfer of the image is brought into contact with the foil-like material, for example by applying a powder of artificial resin which is fixed by momentary annealing. In addition to the above-stated advantages a true and not a mirror image is produced.

According to one embodiment the oil film is, for example, provided on the electrophotographic material at the side facing away from the original during exposure. In this preferably a dye which is refused by the oil is applied to the electrophotographic material after the distillation since this dye will adhere only to zones free of oil or, respectively, to zones with reduced oil film.

According to a modification of the invention the electrophotographical material is brought into pressure-surface-contacting engagement with a receiving material after the distillation so that the oil film distributed over the electrophotographic material is transferred, whereupon the areas of the receiving material which remained free of oil are colored.

Still another aspect of the invention provides that the oil film transferred by distillation to the foil-like material is brought into surface-contacting engagement with a receiving material and that this layer arrangement is exposed to heat radiation whereby the image formed by the oil film is transferred by distillation of the oil, whereupon this image is made visible, for example by application of powder and annealing. In another system of my invention the oil film is applied to a foil-like material whose oil-free side is brought into surface-contacting engagement with that side of the electrophotographic material which, when exposed, is facing away from the original and a receiving sheet is placed on the oil film, whereupon this layer arrangement is exposed to a radiation source by which those areas of the oil film corresponding to the latent image are transferred by distillation into and onto the receiving sheet where the corresponding areas become visible and fixed. The latter method has the advantage that the electrophotographic material too remains free of oil so that it may be used several times.

It is to be noted that preferably a light oil is used for forming the oil film, the oil being derived from cracking crude oil and having a boiling point of between 150 and 160° C. As ink or dyestuff, a black ink is used according to a preferred embodiment.

The apparatus according to the invention is characterized by a transfer station including, for example, a backing surface made of glass or another material having equivalent characteristics, on one side of which a radiation source is arranged while on the other side is disposed the electrophotographic material with the latent image, and on this, possibly by intermediately arranging an oil film, a transfer material, or a receiving material is positioned under pressure engagement, for example by pressure roller, the glass plate being provided with a protective cover, preferably in form of a blacking. Preferably a radiation source for short-wave radiation is provided.

The glass plate may be formed by a rotating cylinder having two transport paths arranged rearwardly thereof, via one of which the electrophotographic material and via the other one the receiving material is fed, the transport path for the electrophotographic material having an exposure station for exposing the original arranged therealong; between this station and the cylinder surface, wetting means for applying the oil film is arranged while in the direction of advance (i.e. forwardly of the cylinder) two additional transport paths are provided, via one of which the electrophotographic material is discharged whereas via the other one the receiving material is fed to dye-applying or developing means, for example a powder-applying or an ink-applying device.

The invention shall now be described in connection with several embodiments illustrated in the accompanying drawing in which:

FIG. 7 is a wiring diagram of the electrical supply and operating circuits for the device shown in FIG. 4;

FIG. 8 is a wiring diagram of the electrical supply and operating circuits for the device shown in FIG. 5; and FIG. 9 is a diagrammatic sectional side view of another surface-wetting device differing from that shown in FIG. 4.

Figure 1:
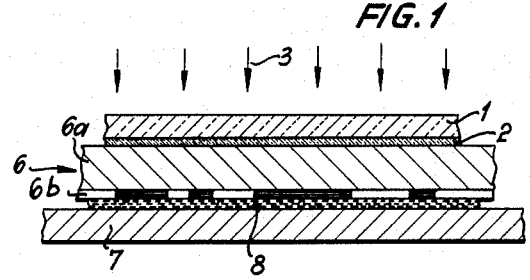
FIG. 1 is a fragmentary diagrammatic cross-sectional side view of a layer arrangement illustrating the invention.
Figure 2:
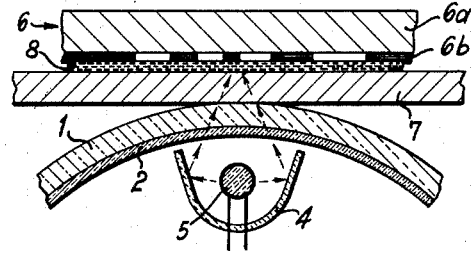
FIG. 2 is a view similar to FIG. 1 but showing a different layer arrangement and disposition of the radiation source.

In FIGS. 1 and 2 a glass plate 1, or another radiation-pervious plate, is provided with a protective layer 2 against passage of radiation. This protective layer may be formed by a dark-colored layer filtering out the visible light which would destroy the electrostatic image.

The radiation source is arranged on one side of the glass plate 1, ie. on top in FIG. 1 where the direction of heat radiation is indicated by arrows 3. According to FIG. 2 a radiation source 5 is shown to be disposed below the layers within a reflector 4.

On the other side of the glass plate 1 an electrophotographic (xerographic) material 6 is arranged according to FIG. 1 formed by a carrier 6a and an electrophotographic layer 6b in which, by electrostatic charge distribution due to exposure of an original a latent image is produced as illustrated by the dark-colored areas. This electrophotographic material is formed as a foil or sheet and may be a material know per se with a layer carrier consisting of paper and a xerographic layer substantially consisting of zinc oxide. Materials of this kind and layers thereof are well known so that a more detailed description seems unnecessary.

On the layer side of the electrophotographic material 6 a receiving or transfer sheet 7, for example a sheet of paper, is arranged. Between this sheet of paper and the electrophotographic layer an oil film 8 is disposed. This oil film consists of light oil produced by fractionation of crude oil and has a boiling point between 150 and 160° C. By exposure to the radiation 3, according to FIG. 1, increased heat is generated in the dark areas of the layer 6b causing the oil in the layer 8 in these areas to be transferred by distillation (vaporization and recondensation) into the receiving sheet whereby in this layer 6b a latent image is produced corresponding to the oil image which, depending on the arrangement of the material, will be a true or a mirror image. The duration and the intensity of the high temperature are selected in such a way that sufficiently high temperatures are obtained in the dark areas of layer 6b that the oil of the oil film 8 adjacent these areas is transported by distillation onto the contacting material.

The same effect is achieved according to FIG. 2 where, however, it should be noted that here the radiation is consumed by the receiving sheet 7 while in the system of FIG. 1 the radiation takes place through the electrophotographic material. In this case also a material with a selenium-based xerographic layer could be used.

In both cases the effect is the same. It should be noted that, according to FIG. 2, the glass plate is cylindrical and is rotated whereby the process takes place continuously, while in FIG. 1 the method is stationary with instantaneous areal exposure rather than successive exposure of portions of the area.

Figure 3:
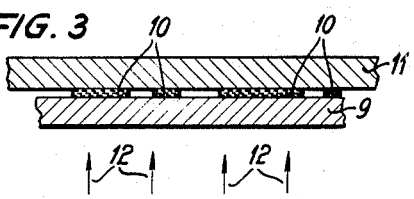
FIG. 3 is a fragmentary cross-sectional view of an arrangement of the appropriate layers demonstrating the transfer of the oil film.

FIG. 3 shows the transfer of the oil film. In this arrangement the transfer sheet 9 corresponds, for example, to the receiving material 7 of FIGS. 1 and 2. It will be noted that the transfer sheet 9 is covered with an oil film at the areas 10 which is produced in the manner described in connection with FIGS. 1 and 2. This oil film is transferred to a receiving material 11 by evenly exposing the layer arrangement composed of the materials 9 and 11 to a heat radiation corresponding to the arrows 12, causing a superdistillation transfer at the oil-covered areas into the receiving material 11. The receiving material 11 may also be a sheet of paper.

It will be noted that a latent image may be produced in the electrophotographic material which is not legible because it is a mirror image. Thus a legible image may be produced by the transfer according to FIGS. 1 and 2 to the receiving material 7. According to FIG. 3 this image may be transformed into a nonlegible mirror image.

Figure 4:
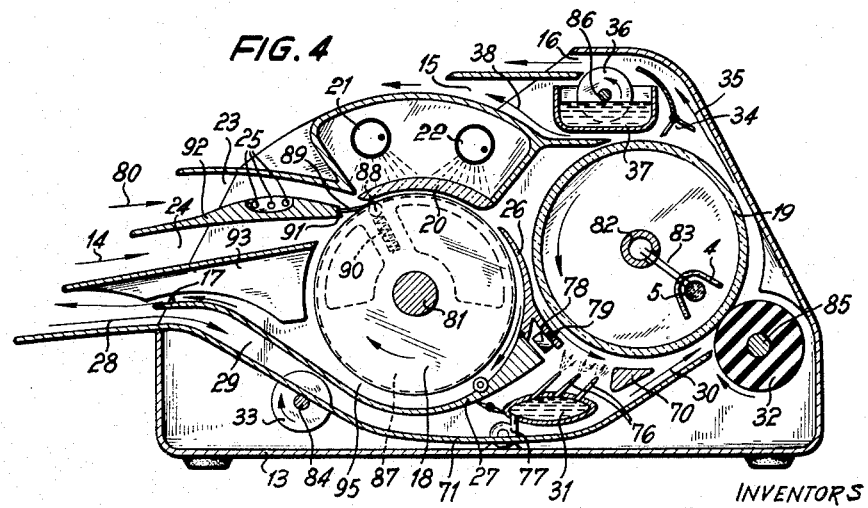
FIG. 4 is a vertical cross-sectional view of a device according to the invention in which merely the parts necessary to explain the invention are shown diagrammatically.

The apparatus according to FIG. 4 is an especially advantageous embodiment in which only those parts are shown which are essential for describing its function. In this embodiment drive and connection means, supply containers and the like are omitted, but in FIG. 7 drive circuits are shown diagrammatically. The direction of rotation of the driven members is marked by arrows. In the housing means 13 there is arranged an inlet 14 and two outlets 15, 16, a separate outlet opening 17 for discharging the original or master sheet being disposed within the inlet-slot arrangement 14. The apparatus is characterized by an extremely simple construction. Substantially it comprises the roller 18 driven in a direction indicated by the arrow and the rotating glass cylinder 19 which, for example, is constructed akin to the glass plate 1 of FIG. 2, including in the illustrated manner a radiation source 5 within a reflector 4. The radiation source and the reflector are stationary.

The roller 18 rotates past a transfer station comprising a concentrically curved glass plate 20 having, along its side remote from the roller 18, two angularly spaced radiation or exposure sources. Starting from the inlet-slot arrangement 14 extend two channels 23, 24 toward the roller 18 merging at a circumferential zone adjacent the glass plate. Within the channel 23, which constitutes the first transport means of this invention, a conventional charging station is arranged; this station includes, for example, three wirelike charging electrodes 25 connected to a high-voltage source and charging the xerographic layer introduced corresponding to the arrow 80 with its layer side facing downwardly. The original or master sheet is introduced through the channel 24, which constitutes a second transport means, with its image facing upwardly so that it will be displaced in proper surface-contacting engagement between the glass plate 20 and the roller 18. In this movement a partial separation of the sheets is maintained by a special arrangement of the roller 18 in a manner described in detail in the commonly assigned copending patent application Ser. No. 53,161, filed August 31, 1961 by Walter Limberger. This roller returns the original past below the backing surface 26 extending to the guide element 27 and onto the inlet-slot arrangement 14 and particularly to the outlet slot 17, while the electrophotographic material is guided above the wedge-shaped backing surface 26, which thus constitutes a first means for separating the master from the latent-image layer, to the cylinder 19 of the heat-treating means.

Simultaneously with the original and the electrophotographical material a copy-receiving sheet is introduced via a third inlet and through the channel 29 (fourth transport means) corresponding to the arrow 28 in which care is taken, either by corresponding staggered relation upon introduction or by differing lengths of the inlet paths, that the copy-receiving paper and the electrophotographic material will meet with relatively staggered edges at the cylinder 19 substantially in the zone marked by the arrow 30 at which the third and fourth transport means merge. In the direction of rotation of the cylinder 19 in front of this zone a schematically illustrated supply means in the form of an oil-spray nozzle 31 is arranged past which the electrophotographic material, which has been provided by exposure with the latent image, is moved, thereby receiving an oil film covering the entire surface of the material. By suitably arranging limit switches it can be achieved that the oil-spray jet will discharge oil only then when an electrophotographic material is moved past by only then starting an oil-spray pump. For this purpose, a nozzle arrangement according to commonly assigned patent application Ser. No. 85,118 may be used advantageously; another suitable surface-wetting means, for example a roller rotating in spaced relation to the cylinder 19 may be used. A surface-wetting arrangement of the latter kind is shown in FIG. 9. In this figure, parts corresponding to like parts in FIG. 4 are designated with like reference numerals.

In the opening between the section of the backing surface 26 extending concentrically to the cylinder 19 and continuation 70 of this backing surface, a circumferential section of a driven wetting roller 73 extends and is rotatably supported in the housing while dipping with part of its circumference into a trough holding a supply of oil. The guide element 71 defining the lower part of the guide path or the channel 29 extends with sufficient spacing below the bottom of trough 75. The circumference of the roller 73 extends through the opening only to a limited extent to avoid wetting the cylinder 19 with oil.

It is to be understood that wetting means may also be provided comprising a supply container for the oil whose wall facing the cylinder 19 is provided with apertures of such cross-section that capillary action normally prevents the discharge of oil while a sheet of material moving past these apertures in surface-engaging contact will suck oil through these apertures due to adhesion forces (i.e. surface tension). In this embodiment the corresponding wall of the supply container may be provided with transversely extending grooves assuring an even distribution of oil.

The illustrated oil-spray nozzle 31 with the spray-nozzle extensions 76 is connected to a pump 77 which, for example, may be started by a switch 78. The switch-actuating arm 79, which is arranged on the backing surface 26, extends into the transport path leading along the cylinder 19 and will be actuated upon passage of a sheet in such a way that the pump is started at the very moment of the passage of a sheet, and a predetermined lag of the pump assures that also sufficient oil is applied to the trailing end of the sheet.

The electrophotographic material and the receiving sheet meeting at 30 are pressed by the roller 32, which is provided with a resilient layer of, for example, rubber, along that section of the cylinder 19 at which the radiant-heating source 5 is effective. Since the roller 32 is driven in a direction indicated by the arrow, the continuous transport is assured. In this regard it should be noted that the length of the path between the glass plate 20 and the roller 32 is shorter than the minimum length of the material to be processed. The receiving sheet is synchronously driven by the roller 32 in the direction indicated by the arrow with the other material sheets transported through the interior of the housing.

The material sheets moving along the cylinder 19 will engage the second separating means 34 and are adjusted with one leading edge projecting relatively to the other so as to form a separating angle known per se and described in German patent 295,853. This separating angle assures that the receiving material provided with the oil image, which with respect to the other surface-contacting sheet has a projecting edges, is advanced in a direction indicated by the arrow 35 and is moved along the sixth transport means over a surface-wetting roller 36 applying an ink to the areas provided with oil. Depending on the intended use of the receiving material, for example as a matrix, a dyestuff can also be applied, the dyestuff being repelled by the areas provided with oil but adhering to the areas of the receiving material which are free of oil.

The distance of the edge of the receiving material projecting relatively to the forward edge of the other contacting sheet may be determined by the length of the channel 29 relative to the guide path beginning at the arrow 80 and extending past the glass plate 20 to the cylinder 19 and the separating means 34.

It is also possible to obtain a corresponding projecting ratio of the leading edges by arranging that the speed of rotation of the roller 33 differs with respect to the speed of rotation of the roller 18 thereby obtaining a differential displacement when the sheets are introduced into the first section of the path or the channels, respectively.

At the developing station, the roller 36 rotates within a supply container 37 for dyestuff, ink or other developer substance. By any suitable known means a continued replenishment of the dyestuff or ink supply may be accomplished. The electrophotographic material is guided by the separating device at 34 in the direction of the arrow 38 to the outlet opening 15 via the fifth transport means and is moved out of the apparatus.

All the rotating parts shown in FIG. 4 are journaled between walls of the housing extending parallel to the plane of the paper. The roller 18 is mounted on a shaft 81. The cylinder 19 is mounted on a hollow shaft 82 through the central opening of which the connecting leads 83 for the radiation source 5 extend. The roller 33 is nonrotatably mounted on the shaft 84, and the roller 32 is nonrotatably mounted on the shaft 85, while the roller 36 is nonrotatably mounted on the shaft 86. The roller 18 includes at least one recessed circumferential section in which a segment shown in broken lines is arranged freely rotatable on the shaft 81. This segment includes a counterweight-like section 87 and, at an oppositely disposed section, a pivot 88 on which a tongue 89 is arranged extending tangentially from the cylindrical circumference of the segment 87 or the roller 18, respectively. The pivot is acted upon by a spring 90 resiliently urging away the tongue 89 so that in its initial position it will engage an abutment 91 of the guide element 92 in which the charging electrodes 25 are arranged and which is disposed between the channels 23 and 24. The outlet opening for the master sheet and the channel 24 are separated by the guide element 93 arranged within the housing, while the channel 29 is separated from the outlet opening 17, and the channel 95 forming a continuation thereof by the guide element 27. The guide element 71 extends below the channel 29 at the lower edge of the inlet-slot arrangement 14.

FIG. 7 shows the drive and the main-connection circuits. Via a main connection 96 and a switch 97, the feed lines 98, 99 may be energized and supply current to the drive motor which, via a transmission 101, rotates the shafts 81, 82, 85, 86 and 84. In addition, these lines are connected via the switch 78 with its actuating arm 79 to the motor of the pump 77. Besides this the exposure sources 21, 22 and via a switch arrangement 102 a high-tension transformer for the electrodes 25 may be connected to the line conductors by the switch 78.

Figure 5:
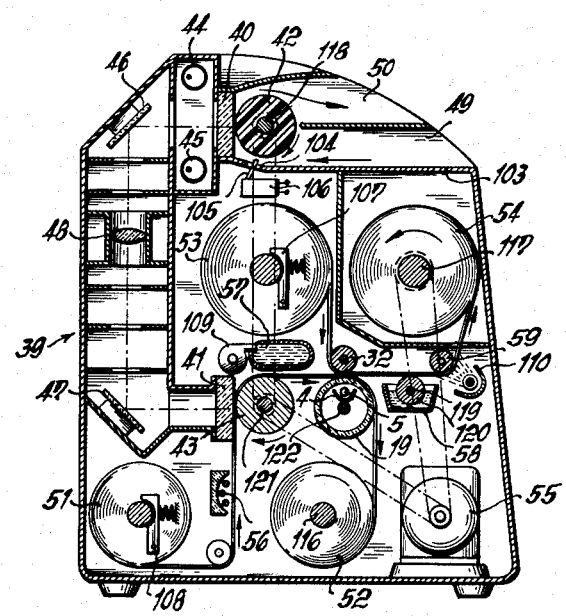
FIG. 5 is a similar cross-sectional view of another embodiment.

According to FIG. 5 an apparatus is shown provided with an optical exposure which, differing from the embodiment shown in FIG. 4, is adapted for processing band material. Spaced in parallel relationship within the housing 39, an exposure platform 40 for the original and an exposure platform 41 for the electrophotographic material are provided. The materials are moved past both exposure platforms by pressure rollers 42, 43 preferably provided with layers of slightly resilient material and driven synchronously in the direction indicated by the arrows. The image platform is exposed to the light rays 44, 45. Between these image platforms the optical arrangement is disposed and comprises deflection means for the exposure rays, such as mirrors or prisms 46, 47, and a system of lenses 48.

Further it will be noted that the lower guide wall 103 of a channel extending from a slot 49 is provided with an aperture 104 through which the actuating arm 105 of a switch 106 extends within the housing. The original is introduced through the slot 49 and discharged from the slot 50, both slots being arranged in the upper part of the housing and thus readily accessible.

A supply roll 51 and a storage roll 52 for the electrophotographic material, and a supply roll 53 and a storage roll 54 for the receiving material are provided in which at least the storage rolls 52, 54 are driven in a direction indicated by the arrows, the drive being such that the band materials are moving with equal speed. The electrical drive and connection unit is shown at 55. It is possible to slightly brake the supply rolls 51, 53 so as to maintain the band material taut. The roll 53 is acted upon by a spring-actuated brake arrangement 107 and the roll 51 is acted upon by a spring-actuated brake arrangement 108.

Both bandlike materials are guided to meet under contacting pressure at a radiation station which, with reference to FIG. 4, corresponds to the cylinder 19 and the roller 32. Like parts are designated with like reference numerals.

In the transporting path of the electrophotographic material between the storage roll 51 and the exposure platform 41, a charging station 56 is arranged; this station includes, in a conventional manner, wire-like electrodes conectable to a high-voltage source so as to be able to process electrophotographic material. Between the image platform 41 and the members 32, 19, a surface-wetting device 57 is arranged serving to apply a film of oil and is designed like the surface-wetting device described in connection with FIG. 4 or 8. The pump, which may be required, is designated with the reference numeral 109.

The electrophotographic material is guided around the cylinder 19 and fed to the storage roll 52, while the copy-receiving material is moved past an ink- or dyestuff-applying device 58 corresponding to the device 36, 37 of FIG. 4. It should be noted that in the transport path behind the device 58, a guide roller 59 of adjustable height is provided, around which the receiving material is fed to the storage roll 54. The guide roller 59 is suitably adjustable in height to allow adjustment of the surface-pressure engagement on the surface at the station 58.

The drive circuit is illustrated in FIG. 8. The leads 112 and 113 are energized by the switch 111. A switch 106 is provided in the line 112 whereby the drive motor 55, the lamps of the exposure sources 44, 45 and the electrodes of charging station 56 can only be connected operatively to the main by operation of the switch 106 so that the latter controls the starting of the apparatus. The pump 109 is actuated by a separate timing relay 114 so that the oil is actually discharged only at the proper moment. FIG. 8 also illustrates the several drive transmissions which are shown schematically in FIG. 5 by dot-dash lines. The transmissions are generally designated with the reference numeral 115 and drive the shaft 116 of the roller 52, the shaft 117 of the roller 54, the shaft 118 of the roller 42, the shaft 119 of the roller 120, the shaft 121 of the roller 43, and the shaft 122 of the cylinder 19, respectively.

Figure 6:
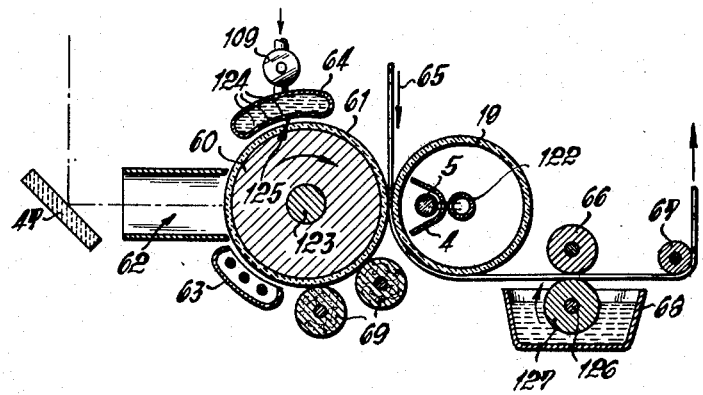
FIG. 6 is a fragmentary and diagrammatic cross-sectional view of another embodiment according to the invention.

While, according to FIGS. 4 and 5, the electrophotographic (e.g. xerographic) material is a foil or band, preferably with a zinc-oxide layer, the embodiment illustrated in FIG. 6 provides a drum 60, the cylindrical surface 61 of which carries an electrophotographic layer, for example based on selenium. This will be exposed through the channel 62, for example, by an arrangement as shown and described in connection with FIG. 5. The drum 60 is driven in the direction indicated by the arrow. Relatively to the direction of rotation in front of the channel, a charging station, known per se, is arranged; behind the channel 62 a surface-wetting station 64 for applying the film of oil is disposed and it should be understood that either spray means or surface-contact-wetting means may be used as described with regard to the arrangement 31 of FIG. 4. A cylinder 19 having the radiation source 5 arranged within a reflector 4 is maintained in pressure-contacting engagement with the cylinder surface 61 by means not shown, e.g. by rubber bands or the like. Around this cylinder, the receiving material, preferably paper in form of sheets or a band, is guided in the direction indicated by the arrow 65 so that it will be supported by the cylinder surface against the adjustable contacting pressure at the moment the radiation is effective to transfer the oil by distillation into the receiving material 65 in accordance with the latent image produced by the exposure. The receiving material is then, by further transport means such as the rollers 66, 67, moved past an ink- or dyestuff-applying station 68 which again corresponds to the members 36, 37 described in connection with FIG. 4.

Cleaning rollers 69, composed for example of absorbent material, are arranged behind the contacting zone with the cylinder 19 with respect to the direction of rotation of the drum 60, the cleaning rollers either removing the film of oil from the cylinder surface 61 or distributing it so evenly that the contours of the latent image in the film of oil will vanish. By means of this the drum 60 with its cylinder surface 61 is continuously usable for making copies of different originals.

In this embodiment also, the illustrated rotatable parts are, as in FIG. 5, journaled in housing walls disposed in parallel relation to the plane of the drawing. FIG. 6 is merely a schematic illustration and its configuration within a housing corresponds to that shown in FIG. 5. If, for example, the path of the receiving material 65, the supply roll 53 and the storage roll 54 are used in the latter arrangement. Also the type of exposure device corresponds to that of FIG. 5. In the embodiment of FIG. 6, the shaft 123 of the drum 60 is rotated upon closing of the switch 106. The spray-jet arrangement for the oil film or the applying station 64 includes a pump 109 corresponding to that of the embodiment shown in FIG. 5, in which the perforated side wall 125 is concentrically curved with respect to the cylinder surface. At the applying station, a shaft 126 carrying a coating roller rotates in the direction indicated by the arrow. This shaft also is driven by the common drive motor of the apparatus.

The invention also includes other combinations of the features than those shown in the different embodiments by way of examples and particularly different undercombinations, the scope being merely limited by the annexed claims.

We claim:

1. In a device for the production of copies from a master, in combination, a housing formed with an inlet; first transport means for conveying a xerographic layer adapted to be electrostatically charged into said housing from said inlet; a charging station in said housing along said first transport means for electrostatically charging said layer, said housing being formed with a second inlet; second transport means extending from said second inlet into the interior of said housing; a transfer station along the path defined by said first and second transport means whereby a master sheet inserted into said second inlet is juxtaposed with said layer at said transfer station, said transfer station being provided with a source of radiant energy for forming a latent image of said master on said layer; first separating means for separating said master from said layer upon displacement thereof by said first and second transport means beyond said transfer station; a heat-treating station spaced from said first separating means; third transport means for displacing said layer from said first separating means to said heat-treating station, said housing being provided with a third inlet for introduction of a copy-receiving sheet into said housing; fourth transport means between said third inlet and said heat-treating station for juxtaposing said copy-receiving sheet with said layer, said third and fourth transport means merging at said heat-treating station; supply means for interposing a film of oil vaporizable by the heat of said heat-treating station between said layer and said copy-receiving sheet, said heat-treating station including a radiant-heating source for selectively vaporizing said film to transfer oil vapors to said copy-receiving sheet in accordance with said image; second separating means forwardly of said heating station for parting said layer from said copy-receiving sheet; fifth transport means for removing said layer from said second separating means; sixth transport means for leading said copy-receiving layer away from said second separating means; and a developing station for dispersing a developer substance on a surface of said copy-receiving sheet to which vaporized oil has adhered in accordance with the image on said layer, said sixth transport means conducting said copy-receiving sheet to said developing station.

2. The combination as defined in claim 1 wherein the heat-treating station is provided with a closed, substantially cylindrical glass plate journaled in said housing means, said third and fourth transport means merging at the periphery of said cylinder, said heat-treating station further comprising pressure means for urging said copy-receiving sheet and said layer into contact with one another and said plate.

3. In a device for the reproduction of copies by oil transfer, in combination, a housing; a heating station in said housing for selectively distilling an oil from a film to a copy-receiving layer in accordance with a latent image carried by a xerographic layer; a first transport path leading within said housing to said heating station and provided with first transport means for displacing a xerographic layer to said heating station; a second transport path formed in said housing and leading toward said heating station for feeding a copy-receiving layer thereto; charge means along said first transport path for electrostatically charging a xerographic layer; exposure means along said first transport path between said charge means and said heating station for exposing the electrostatically charged xerographic layer and forming thereon a latent electrostatic image corresponding to a master copy; surface-wetting means along one of said paths between said exposure means and said heating station for applying a film of distillable oil between said layers, said layers merging at said station with said film disposed between them; separating means beyond said heating station for directing said layers along respective further paths including a third transport path for said xerographic layer and a fourth transport path for said copy-receiving layer; developing means along at least one of said transport paths for applying a pigmentatious material to an oil-carrying surface of the respective layer, thereby developing an image corresponding to the latent image originally formed on said xerographic layer; second transport means along said second transport path for displacing said copy-receiving layer therealong, said heating station including a pair of displaceable surfaces adapted to sandwich said layers between them with surface-contact pressure; and drive means for said first and second transport means, said pair of displaceable surfaces and said separating means.

4. The combination defined in claim 3, further comprising means in said housing for mounting a first supply roll for said xerographic layer and a second supply roll for said copy-receiving layer therein, each of said layers being constituted as a continuous band, said first support roll being disposed at the beginning of said first transport path and said second supply roll being disposed at the beginning of said second transport path; and means for receiving first and second take-up rolls in said housing, said first and second take-up rolls being disposed respectively at the ends of said third and fourth transport paths for receiving said xerographic and copy-receiving layers, respectively, said drive means including mechanism for rotating said first and second take-up rolls.

5. The combination defined in claim 3 wherein at least one of said displaceable surfaces at said heating station is a cylindrical pressure roller urging said layers against the other of said displaceable surfaces, said xerographic layer surrounding said roller and forming a coating on the surface thereof with said first transport path being constituted by the cylindrical movement of the periphery of said roller, said charge means, exposing and surface-wetting means being angularly offset about the periphery of said roller in the direction of rotation thereof.

6. The combination defined in claim 3 wherein one of the displaceable surfaces at the heating station is formed as a rotatable cylindrical radiation-permeable drum, said heating station further comprising a source of radiant energy disposed within the interior of said drum, the other of said displaceable surfaces forming a pressure roller urging said layers jointly against said drum, said drum being provided with a dark layer for filtering from the radiant energy emitted by said source wavelengths capable of exposing said electrostatic layer to destroy the latent image carried thereby.

References Cited by the Examiner
UNITED STATES PATENTS

| | | | |
|---|---|---|---|
| 2,909,971 | 10/59 | Barber | 95—1.7 |
| 2,946,682 | 7/60 | Lauriello | 96—1 |
| 2,947,625 | 8/60 | Bertelsen | 96—1 |
| 2,968,553 | 1/61 | Gundlach | 96—1 |
| 2,984,163 | 5/61 | Giaimo | 95—1.7 |
| 3,062,110 | 11/62 | Shepardson et al. | 95—1.7 |

FOREIGN PATENTS

| | | |
|---|---|---|
| 943,401 | 12/63 | Great Britain. |
| 943,403 | 12/63 | Great Britain. |
| 60,431 | 1/61 | Republic of South Africa. |

EVON C. BLUNK, *Primary Examiner.*

N. G. TORCHIN, *Examiner.*